United States Patent
Welschholz et al.

(10) Patent No.: US 7,469,951 B2
(45) Date of Patent: Dec. 30, 2008

(54) DEVICE HOLDER FOR FITTING IN A MOTOR VEHICLE

(75) Inventors: Jörg Welschholz, Herscheid (DE); Werner Volmer, Iserlohn (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 12/069,925

(22) Filed: Feb. 14, 2008

(65) Prior Publication Data

US 2008/0174136 A1 Jul. 24, 2008

Related U.S. Application Data

(63) Continuation-in-part of application No. PCT/EP2007/001491, filed on Feb. 21, 2007.

(30) Foreign Application Priority Data

Feb. 23, 2006 (DE) .................. 10 2006 008 420

(51) Int. Cl.
*B60R 11/00* (2006.01)
(52) U.S. Cl. .................. 296/37.8; 296/37.12
(58) Field of Classification Search ............... 296/37.8, 296/37.12, 24.34, 70, 1.07; 312/237, 295, 312/270.2, 309, 223.1, 223.4, 223.6
See application file for complete search history.

(56) References Cited

U.S. PATENT DOCUMENTS

| 5,836,496 | A  | * | 11/1998 | Levin et al. ............... 224/553 |
| 6,480,378 | B2 |   | 11/2002 | Chang |
| 6,942,267 | B1 | * | 9/2005  | Sturt ..................... 296/24.34 |
| 7,004,527 | B2 | * | 2/2006  | Niwa et al. .............. 296/24.34 |
| 7,287,795 | B1 | * | 10/2007 | Thomas .................. 296/24.34 |
| 7,413,229 | B2 | * | 8/2008  | Kukucka et al. ......... 296/24.34 |
| 2002/0030375 | A1 | * | 3/2002 | Eguchi ..................... 296/37.8 |
| 2002/0145850 | A1 |   | 10/2002 | Chang |
| 2002/0163215 | A1 |   | 11/2002 | Emerling et al. |
| 2003/0052129 | A1 | * | 3/2003 | Fukuo ....................... 220/350 |
| 2004/0118851 | A1 |   | 6/2004 | Shinomiya |
| 2004/0245796 | A1 | * | 12/2004 | Maierholzner .......... 296/37.8 |
| 2005/0018392 | A1 | * | 1/2005 | Strohmeier et al. ....... 361/683 |
| 2005/0218681 | A1 | * | 10/2005 | DePue et al. ............ 296/37.12 |

(Continued)

FOREIGN PATENT DOCUMENTS

DE        83 13 193        9/1983

(Continued)

*Primary Examiner*—Jason S Morrow
(74) *Attorney, Agent, or Firm*—Brooks Kushman P.C.

(57) ABSTRACT

A device holder assembly for use in a vehicle includes a compartment having a top side opening, a device holder attached to the compartment for holding a mobile electronics device, and a closure attached to the compartment. The holder is movable with respect to the compartment between a storage position in which the holder is stored within the compartment and a use position in which the holder extends out from the compartment. The closure is movable relative to the top side of the compartment along lateral sides of the compartment between an opened position in which the closure opens the compartment, an intermediate closed position in which the closure substantially closes the compartment while the holder is in its use position extending out from the compartment, and a fully closed position in which the closure fully closes the compartment while the holder is in its storage position within the compartment.

17 Claims, 5 Drawing Sheets

U.S. PATENT DOCUMENTS

| | | | |
|---|---|---|---|
| 2006/0108816 A1* | 5/2006 | Radu et al. | 296/24.34 |
| 2007/0102463 A1* | 5/2007 | Thomas | 224/275 |
| 2007/0138822 A1* | 6/2007 | Feit et al. | 296/70 |
| 2007/0152461 A1* | 7/2007 | Joler et al. | 296/24.34 |
| 2007/0176449 A1* | 8/2007 | Kukucka et al. | 296/24.34 |
| 2007/0205622 A1* | 9/2007 | Whitens et al. | 296/24.34 |

FOREIGN PATENT DOCUMENTS

| | | |
|---|---|---|
| DE | 42 20 670 A1 | 1/1994 |
| DE | 198 17 345 A1 | 10/1999 |
| DE | 199 24 618 A1 | 11/2000 |
| DE | 199 38 690 A1 | 2/2001 |
| DE | 201 06 114 U1 | 12/2001 |
| DE | 100 62 163 A1 | 6/2002 |
| EP | 0 976 616 A1 | 2/2000 |

* cited by examiner

DEVICE HOLDER FOR FITTING IN A MOTOR VEHICLE

CROSS-REFERENCE TO RELATED APPLICATIONS

This is a continuation-in-part of International Application PCT/EP2007/001491, published in German, with an international filing date of Feb. 21, 2007, which claims priority to DE 10 2006 008 420.9, filed Feb. 23, 2006, the disclosures of which are both hereby incorporated by reference.

BACKGROUND OF THE INVENTION

1. Field of the Invention

The present invention relates to a device holder to be installed in a vehicle for holding a mobile electronics device such as an entertainment, communication, data-processing, or information device.

2. Background Art

Mobile electronics devices such as telephones, navigation systems, entertainment devices, and data-processing devices are finding increasing use in vehicles as an alternative to permanently installed devices. Advantages of mobile devices include users being able to use the devices while in and out of vehicles and outdated devices may be replaced by new devices without complicated vehicle installation operations.

A device holder holds a mobile device inserted therein. The holder is installed in a vehicle to mechanically connect the device held in the holder to the vehicle. The device may be electrically connected via cables to a power network or other devices of the vehicle. For example, a mobile telephone held in a holder installed in a vehicle may be electrically connected to a hands-free device installed in the vehicle. One type of holder is installed in a vehicle by being attached to the vehicle windshield or dashboard via a suction cup. A second type of holder is installed in a vehicle by being wedged inside ventilation openings of the vehicle passenger compartment. Problems with the second type of holder include air flow being obstructed by either the holder or by the device held in the holder and the cables being exposed.

A problem with typical holders installed in vehicles include the following. Such holders may be perceived as being recognizable retrofitted accessories. Such holders which are to be attached to the dashboard do not match the design of the dashboard. Guiding cables from a mobile device held in such a holder to vehicle-side connection points is sometimes problematic as the cables may have to be attached to the holder and/or the dashboard.

In order to prevent the risk of theft of a mobile device mounted in a device holder in a vehicle that is parked, a vehicle operator usually removes the device from the holder and then stows or carries away the device. However, simply removing the device is not a sufficient deterrent to break-ins because a thief noticing from the outside that the holder is in the vehicle may assume that a device to be held by the holder has merely been removed from the holder but is still located in the vehicle such as in the glove compartment.

SUMMARY OF THE INVENTION

An object of the present invention includes a device holder to be installed in a vehicle for holding a mobile electronics device in which the device holder does not have the problems associated with typical device holders.

In carrying out the above object and other objects, the present invention provides a device holder assembly for use in a vehicle. The device holder assembly includes a compartment, a device holder, and a compartment closure. The compartment has an opening on a top side. The device holder is attached to the compartment for holding a mobile electronics device. The device holder is movable about a swivel axis with respect to the compartment between a storage position in which the device holder is stored within the compartment and a use position in which the device holder extends out from the compartment. The closure is attached to the compartment. The closure is movable relative to the top side of the compartment along lateral sides of the compartment between an opened position in which the closure opens the compartment, an intermediate closed position in which the closure substantially closes the compartment while the device holder is in its use position extending out from the compartment, and a fully closed position in which the closure fully closes the compartment while the device holder is in its storage position stored within the compartment.

Further, in carrying out the above object and other objects, the present invention provides a device holder assembly for use in a vehicle. The device holder assembly includes a compartment, a device holder, and a closure. The compartment has an opening on a top side. The device holder is attached to the compartment for holding a mobile electronics device. The device holder is movable with respect to the compartment between a storage position in which the device holder is within the compartment and a use position in which the device holder extends out from a portion of the opening of the compartment. The closure is attached to the compartment. The closure is movable relative to the top side of the compartment along lateral sides of the compartment between: an opened position in which the closure opens the compartment while the device holder is in either of the storage and use positions such that the closure allows the device holder to move between the storage and use positions; a fully closed position in which the closure covers the compartment including the portion of the compartment opening which the device holder extends out from while the device holder is in the use position such that the closure prevents the device holder from moving between the storage and use positions; and an intermediate closed position in which the closure covers the compartment with the exception of the portion of the compartment opening which the device holder extends out from while in the use position such that the closure prevents the device holder from moving between the storage and uses positions. The closure is movable to the intermediate closed position after the device holder has been moved to the use position.

In accordance with embodiments of the present invention, a device holder assembly for being installed in a vehicle to hold a mobile electronics device includes a compartment, a device holder for holding the mobile device, and a closure. The compartment is in the form of a storage case having an opening on its top side. The compartment is embedded in the top side of the dashboard of a vehicle. The holder is anchored in the compartment while being able to swivel relative to the compartment between a not-in-use position and a use position. The holder is stored in the compartment while in the not-in-use position. The holder is swivelled out from the compartment while in the use position. The closure is movable to close and open the compartment opening. In particular, the closure is movable between an opened position in which the closure exposes the compartment opening; an intermediate closed position in which the closure substantially closes the compartment opening while the holder is swivelled out from the compartment; and a fully closed position in which the closure completely closes the compartment opening while the holder is stored in the compartment.

The compartment may be installed in the vehicle either during the manufacture of the vehicle or subsequently thereafter. In the latter case, a receptacle for use with the device holder assembly may already be installed in the interior paneling of the vehicle and covered by a blind plug. The compartment may be dimensioned to accommodate the holder together with the device held by the holder within the compartment while the holder is in its not-in-use position.

While the holder is in its not-in-use position with or without a mobile device, the closure can be moved to its fully closed position to completely cover the compartment opening. It cannot be discerned from the outside as to whether the closed compartment is simply a storage case or a storage case containing a holder integrated therein.

While the holder is in its use position with or without a mobile device such that the holder with or without the device is swivelled out relative to the compartment, the closure can be moved to its intermediate closed position to close the remaining portion of the compartment opening. That is, the closure at least substantially closes the remaining opening of the compartment next to the swivelled-out holder. As a result, other articles which may be in the compartment are closed off from access.

The holder may bear electrical interfaces such as plug-in contacts for connecting the mobile device inserted in the holder to the power supply or other systems of the vehicle. Electrical connecting cables running from the compartment under the trim of the dashboard are not visible to a vehicle user due to the compartment being installed in the vehicle.

The compartment preferably has a width greater than the width of the holder. In this case, the compartment may be used as a storage case for other articles such as eyeglasses, keys, and the like in addition to accommodating a mobile device. In this design, a user may seek to completely close the remaining opening of the compartment while the holder is swivelled out. For this purpose, the closure may have two closure extensions which enclose a recess. The closure extensions laterally enclose the holder which is swivelled out from the compartment and in the intermediate closed position cover the regions of the compartment opening between the holder and the lateral boundaries of the compartment. In order to close these regions of the compartment opening, the closure elements may be provided on the holder itself to cover regions of the compartment opening extending between the holder and the lateral boundaries of the compartment while the holder is in the swivelled-out position. The closure covers the remaining compartment opening at the back side of the holder and the rear termination of these closure elements.

In accordance with an embodiment, the holder may be moved against the force of a restoring element from its swivelled-out use position from the compartment to its swivelled-in not-in-use position in the compartment. The holder together with the device accommodated therein is then swivelled-out from its not-in-use position to its use position by the force stored in the restoring element. The holder is advantageously kept locked in its not-in-use position. To swivel out the holder, the lock may be released by manually actuating by pressing down on the holder or the device held thereby such that the holder automatically swivels out into its use position. The lock is preferably in a mechanical linkage with the closure so that the holder is not able to swivel out from its not-in-use position to its use position unless the closure is in its opened position with the compartment opening being completely opened. The swivel-out motion of the holder may also be coupled to the opening motion of the closure. In this case, the lock is released by moving the closure such that the holder automatically swivels out from the opened compartment as a result of force from a restoring element.

The closure may have different designs such as a flap, sliding flap, or sliding closure. The closure may be a roller blind closure formed from multiple articulately connected closure elements. The closure may be formed of individual, mutually displaceable louver-like closure elements which may move relative to one another such as in a telescoping manner to open the compartment and displace the closure in its two different closed positions.

When the holder is in its swivelled-out position, the holder may swivel over a limited angular range about a rotational axis extending transversely to the swivel axis. This allows a display of the device held by the holder to swivel toward the vehicle driver or toward the front seat passenger in the vehicle. The swivel-out motion of the holder from its not-in-use position in the compartment to its swivelled-out use position may be associated with a motion compartment thus allowing the holder and the display of the device to swivel toward the driver.

Many mobile devices to be held by the holder have an LCD display with limited brightness. Therefore, the holder may have a sun shield to shade the display of a device held by the holder. The sun shield may be designed to be mounted manually onto the holder. Alternatively, the sun shield may have a foldable design such that its fold-out and fold-in motions are mechanically linked to the swivel-out and swivel-in motion of the holder with sun shield being in a desired shading position when the holder is swivelled out.

The above features, other features, and advantages of the present invention are readily apparent from the following detailed descriptions thereof when taken in connection with the accompanying drawings.

DETAILED DESCRIPTION OF THE PREFERRED EMBODIMENT(S)

Referring now to FIGS. 1, 2, 3, 4, and 5, perspective views of a device holder assembly having a compartment 2 embedded in the top side of a dashboard 1 of a vehicle, a device holder 6 integrated in compartment 2 for holding a mobile electronics device 15, and a compartment closure 4 in accordance with an embodiment of the present invention are shown. Compartment 2 is in the form of a storage case having an opening on its top side. Holder 6 is anchored in compartment 2 while being able to swivel relative to compartment 2 between a not-in-use position and a use position. Holder 6 is stored in compartment 2 while in the not-in-use position. Holder 6 is swivelled out from compartment 2 while in the use position. Closure 4 is movable to close and open the opening of compartment 2. Closure 4 is movable between an opened position in which closure 4 exposes compartment 2; an intermediate closed position in which closure 4 substantially closes compartment 2 while holder 6 is swivelled out from compartment 2; and a fully closed position in which closure 4 completely closes compartment 2 while holder 6 is stored in compartment 2.

Figure 1:
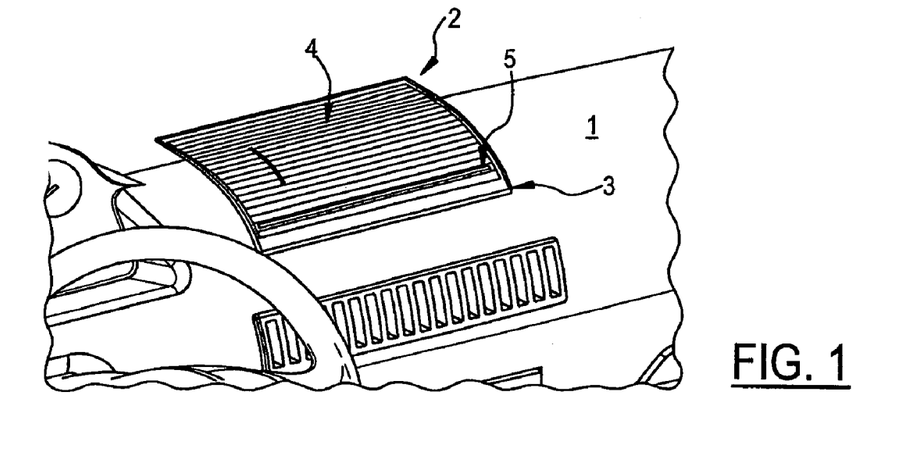
FIG. 1 illustrates a perspective view of a device holder assembly having a compartment embedded in the top side of the dashboard of a vehicle, a device holder integrated in the compartment for holding a mobile electronics device, and a compartment closure in accordance with an embodiment of the present invention in which the compartment is closed off as the closure is in a fully closed position.

In FIG. 1, compartment 2 is closed off as closure 4 is in its fully closed position. Compartment 2 is enclosed by a frame 3. Closure 4 is roller blind closure conforming to the curved shape of dashboard 1. Closure 4 includes articulately interconnected elements which are guided in lateral guide rails. A handle strip 5 projects from one of the bottom elements of closure 4. Compartment 2 is opened by moving closure 4 toward the windshield as indicated by the arrow in FIG. 1. During this motion, closure 4 is pushed into a storage region behind or beneath compartment 2. The guide rails which guide closure 4 have a corresponding curvature.

Figure 2:
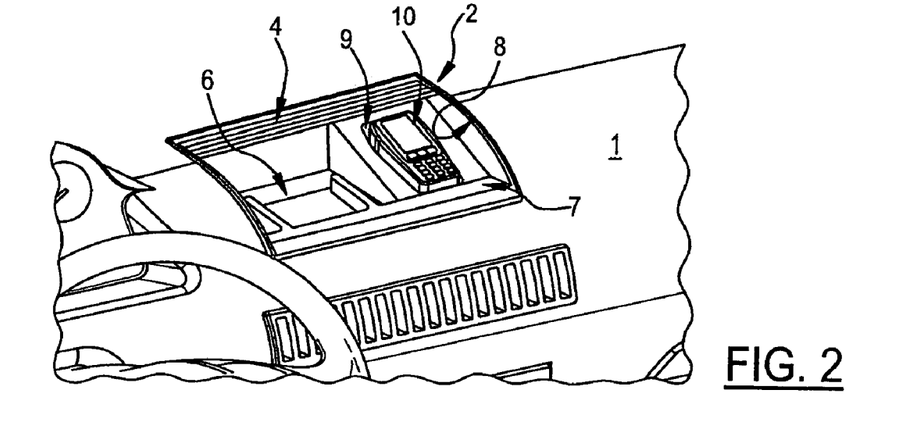
FIG. 2 illustrates a perspective view of the device holder assembly in which the compartment is fully opened as the closure is in a fully opened position.

In FIG. 2, compartment 2 is fully opened as closure 4 is in its fully opened position. Holder 6 is in its not-in-use position within compartment 2. A strip 7 pivotably links holder 6 to side walls 8 of compartment 2. Compartment 2 acts as a storage case by including a receptacle 9 for insertion of a mobile device such as a mobile telephone 10.

Figure 3:
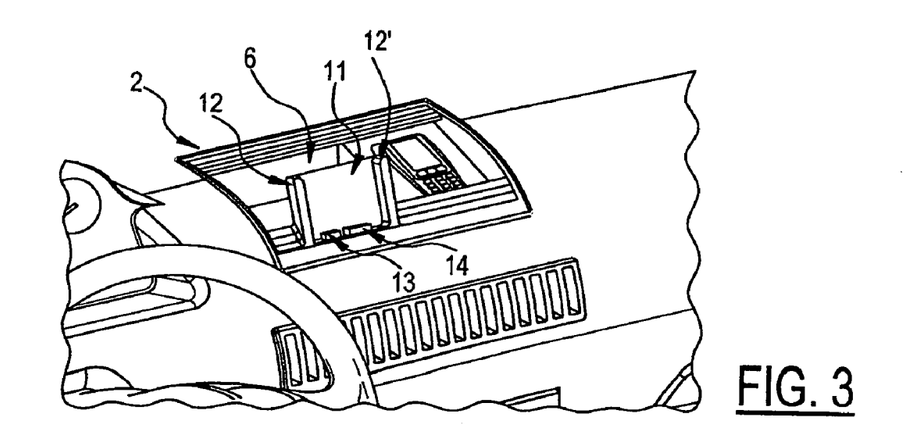
FIG. 3 illustrates a perspective view of the device holder assembly in which the compartment is fully opened and the device holder is swivelled out from the compartment.

In FIG. 3, compartment 2 is fully opened and device holder 6 is swivelled out from compartment 2 in its use position. In this position, the front side of strip 7 strikes the interior of the front wall of compartment 2. The swivel-out motion of holder 6 is achieved by force of an actuator which stores energy for swiveling out holder 6 when holder 6 is in its not-in-use position. The actuator may be a pneumatic damper.

Holder 6 has a receptacle 11 for holding a mobile electronics device therein. Two side members 12, 12' of holder 6 delimit receptacle 11 in the direction of the width of compartment 2. Side members 12, 12' hold and secure a mobile device inserted into receptacle 11. Electrical plug-in connections 13, 14 are in the region of the lower termination of receptacle 11. Connections 13, 14 are used for contacting the device held in receptacle 11. For example, connection 13 is used to supply power to the device and connection 14 is used to connect the device to an onboard information network.

Figure 4:
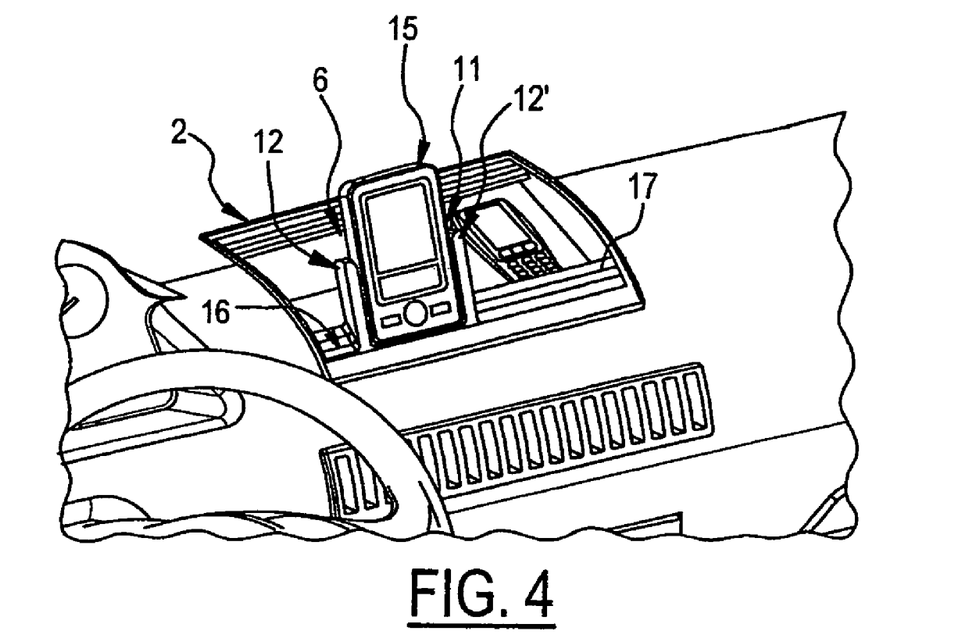
FIG. 4 illustrates a perspective view of the device holder assembly in which the compartment is fully opened and the device holder with a mobile electronics device inserted therein is swivelled out from the compartment.
Figure 5:
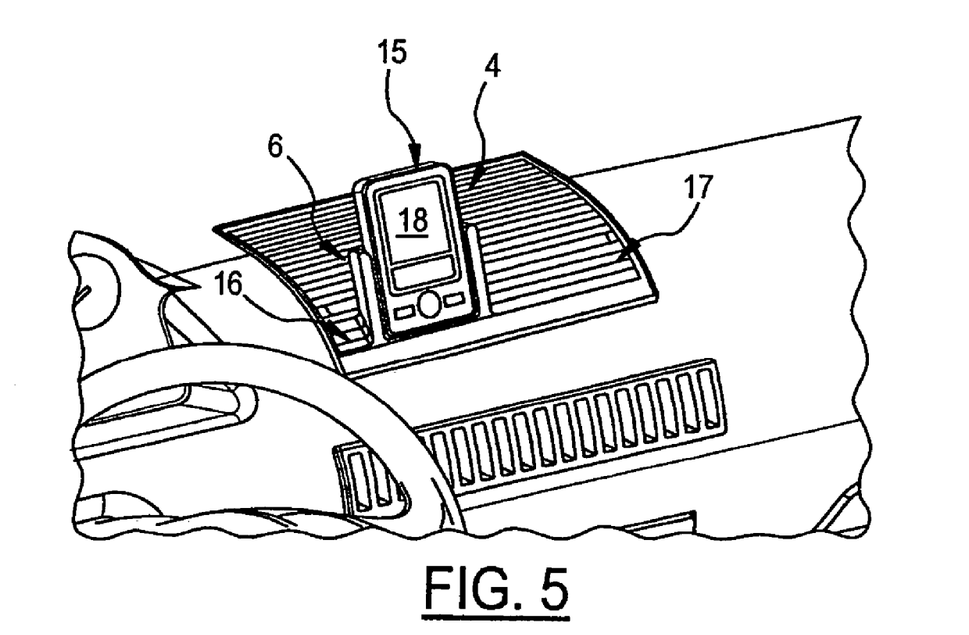
FIG. 5 illustrates a perspective view of the device holder assembly in which the compartment is closed and the device holder with the mobile electronics device inserted therein is swivelled out from the compartment.

In FIG. 4, compartment 2 is fully opened and device holder 6 with a mobile navigation device 15 inserted into receptacle 11. Device 15 is connected to the vehicle power supply and to the data bus via connections 13, 14 to receive power and vehicle-related data such as vehicle speed. In FIG. 5, compartment 2 is closed and holder 6 with device 15 inserted therein is swivelled out from compartment 2. Closure elements 16, 17 are integrally molded onto the outer sides of side holder members 12, 12' as part of strip 7. The design of the top side of closure elements 16, 17 is the same as closure 4. Closure elements 16, 17 close the regions of the opening in compartment 2 extending between holder 6 and side walls 8 of compartment 2. Holder 6 is secured in its swivelled-out position by a lock such as a detent mechanism. The depth of compartment 2 facing in the direction of travel is dimensioned so that holder 6 together with device 15 held thereby may be swivelled into compartment 2.

Closure 4 is designed so that, instead of being in its fully closed position completely closing compartment 2 (shown in FIG. 1), closure 4 may be brought into its intermediate closed position (shown in FIG. 5). The intermediate closed position is characterized in that the front side of closure 4 strikes the rear termination of holder 6 and closure elements 16, 17 and is secured in this position. Although compartment 2 is closed, holder 6 is in its use position swivelled out from compartment 2 and device 15 is ready for use. In particular, in this configuration of compartment 2 being in the top side of dashboard 1, device 15 is in the direct visual field of the driver. The driver is thus able to observe display 18 of device 15 without having to avert gazing from the roadway.

When the vehicle is parked and it is intended that device 15 cannot be seen from the outside, closure 4 is opened and holder 6 together with device 15 is swivelled into compartment 2 until holder 6 has been brought into its not-in-use position (shown in FIG. 2). Compartment 2 is then closed by pulling closure 4 forward. From the outside, closed compartment 2 gives the impression that compartment 2 is a conventional storage compartment.

Figures 6A, 6B:
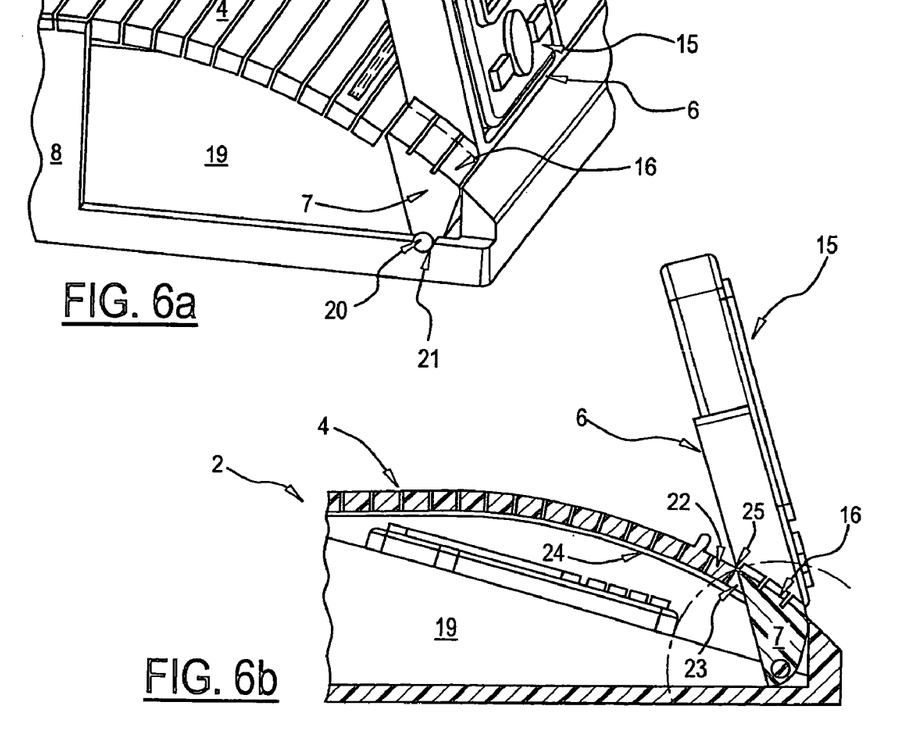
FIGS. 6a, 6b, 6c, and 6d respectively illustrate enlarged detail views of the device holder assembly in which the device holder together with a mobile electronics device inserted therein is swivelled out from the compartment.

Referring now to FIGS. 6a, 6b, 6c, and 6d, with continual reference to FIGS. 1, 2, 3, 4, and 5, enlarged detail views of the device holder assembly in which device holder 6 together with device 15 inserted therein is swivelled out from compartment 2 are respectively shown. FIG. 6a illustrates a perspective external and internal view of interior 19 of compartment 2. The design of the pivotable bearing of strip 7 in side wall 8 contains a bearing pin 20. Bearing pin 20 engages in a bearing hole 21 in side wall 8. As shown, closure elements 16, 17 are part of strip 7. Closure 4 is in its intermediate closed position closing the remaining opening of compartment 2 and continues to the rear termination of closure elements 16, 17 and holder 6. Closure 4 is locked in this position.

FIG. 6b illustrates a schematic cross section of holder 6. This illustration shows the support system of holder 6 on a first roller blind element 22 of closure 4. A guide 23 for closure 4 is associated with right side wall 8 of compartment 2. Guide 23 has a guide strip 24 located beneath closure 4. Closure 4 rests on the top side of guide strip 24. In the use position of holder 6 swivelled out from compartment 2, the back side of holder 6 is supported on a front edge 25 of first roller blind element 22. As a result of closure 4 being secured in its intermediate closed position (shown in FIGS. 5, 6a, 6b, 6c, and 6d), guide strip 24 forms an abutment for holder 6 which is supported by first roller blind element 22. Due to the angled configuration of the plane of the front end of closure 4 with respect to holder 6, wherein these two elements define an angle of approximately 45°, the lock for closure 4 only has to withstand a portion of the forces exerted by holder 6 which result in opening of closure 4. These forces intercepted by closure 4 (i.e., guide strip 24) result from the combined weight of holder 6 and device 15 therein. These forces increase when device 15 is operated by keystrokes.

Figures 6C, 6D:
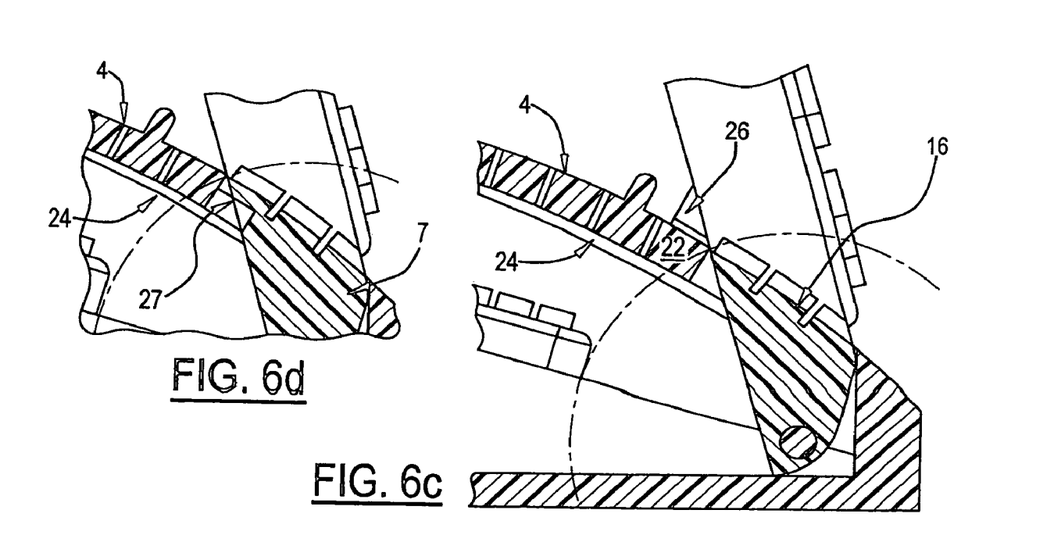

FIG. 6c illustrates a support strip 26 which according to another embodiment may be integrally molded onto the back side of holder 6. This support system is shown in FIG. 6d in an illustration that is enlarged with respect to FIG. 6b. Support strip 26 overlaps first roller blind element 22 when closure 4 is in its intermediate closed position. Force is then introduced into first roller blind element 22 at approximately right angles to the longitudinal extension of guide strip 24. For such a design, in its position closing the remaining opening of compartment 2, closure 4 in FIG. 6c essentially requires no additional locking. The same effect may be achieved when a strip 27, which is a continuation on the bottom of the front side of first roller blind element 22, is integrally molded onto first roller blind element 22, and strip 27 engages beneath strip 7 together with its closure elements 16, 17 in the intermediate closed position of closure 4 shown in FIG. 6b.

Figure 7A:
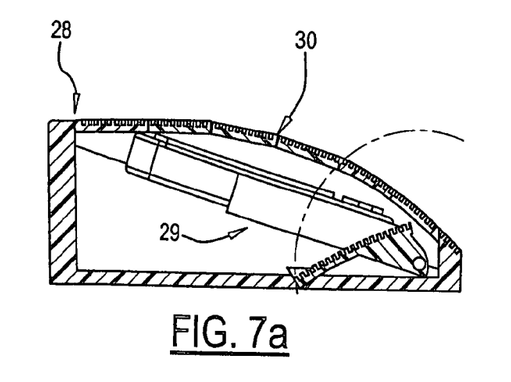
FIGS. 7a, 7b, 7c, and 7d respectively illustrate enlarged detail views of a device holder assembly having a compartment, a device holder integrated in the compartment for holding a mobile electronics device, and a compartment closure in accordance with another embodiment of the present invention.
Figure 7B:
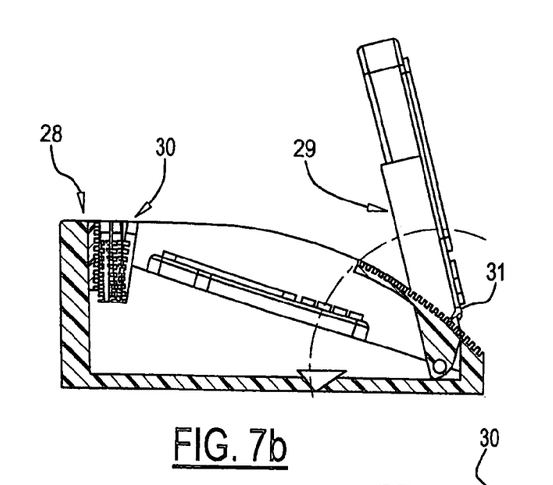
Figure 7C:
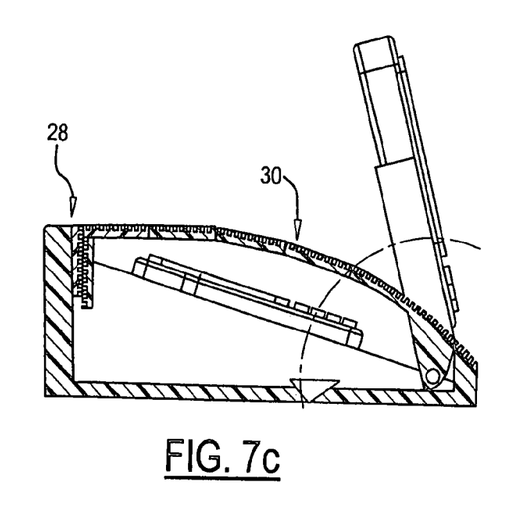
Figure 7D:
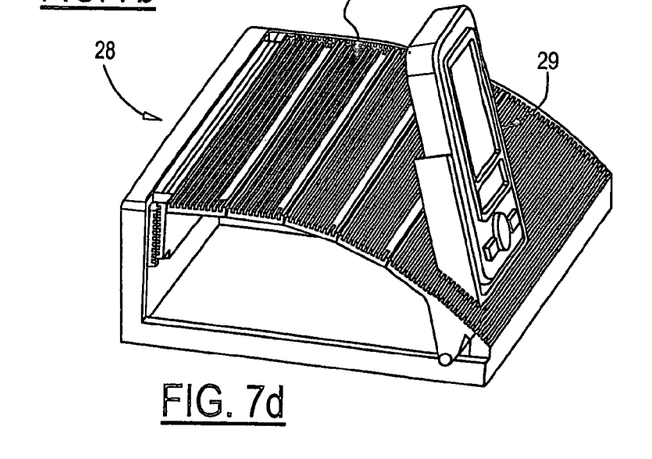
Figure 8A:
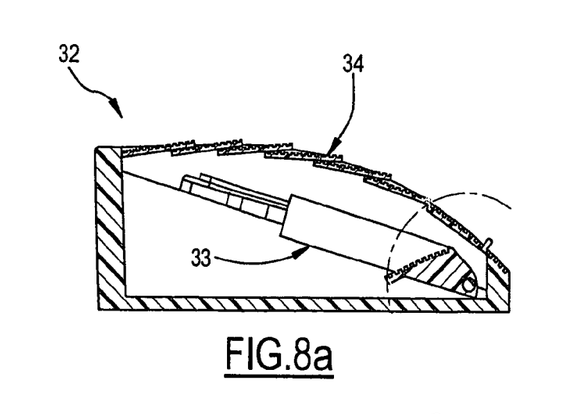
FIGS. 8a, 8b, 8c, and 8d respectively illustrate enlarged detail views of a device holder assembly having a compartment, a device holder integrated in the compartment for holding a mobile electronics device, and a compartment closure in accordance with another embodiment of the present invention.
Figure 8B:
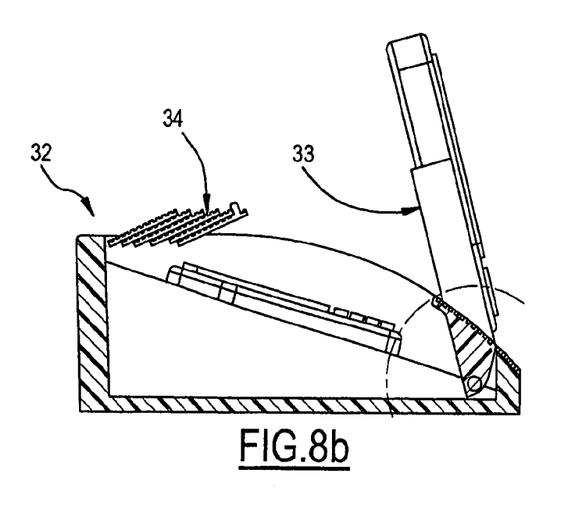
Figure 8C:
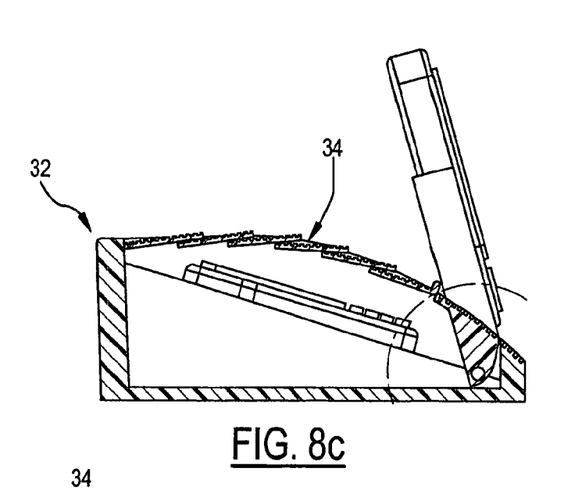
Figure 8D:
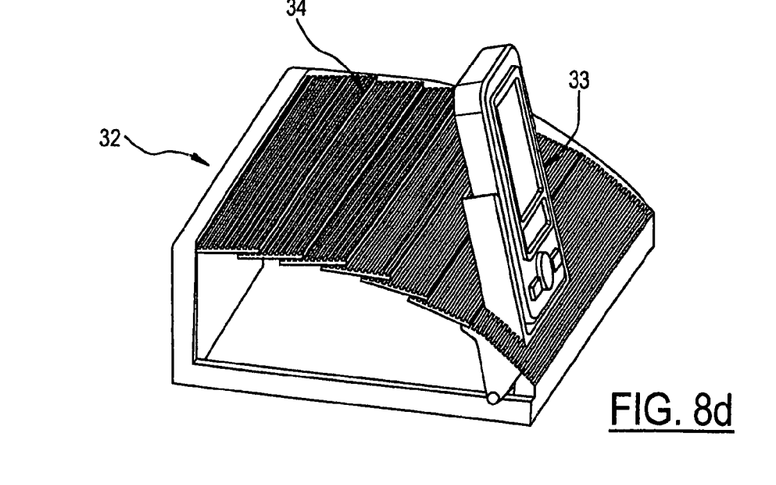

Referring now to FIGS. 7a, 7b, 7c, and 7d, with continual reference to the preceding figures, enlarged detail views of a device holder assembly having a compartment 28, a device holder 29 integrated in compartment 28 for holding a mobile electronics device, and a compartment closure 30 in accordance with another embodiment of the present invention are respectively shown. Compartment 28 with its holder 29 has the same basic design as compartment 2 with its holder 6. However, the design of closure 30 is different with respect to closure 4. Closure 30 is a louvered closure whose individual louvers may be folded into one another for opening compartment 2. (Compartment 28 is fully closed in FIG. 7a and is opened in FIG. 7b.) Closure elements 31 which are integrally molded to the sides of holder 29 have a length in the direction of motion of closure 30 corresponding to the length of two individual louvers of closure 30. FIG. 7c illustrates closure 30 in its intermediate closed position closing the remaining opening of compartment 28 with holder 29 swivelled out. This illustration shows that two individual louvers remain in their stored position at the rear wall of compartment 28 and are not needed for closing the remaining opening. FIG. 7d illustrates a schematic external and internal view of component 28 closed by closure 30 together with swivelled-out holder 29.

Referring now to FIGS. 8a, 8b, 8c, and 8d, with continual reference to the preceding figures, enlarged detail views of a device holder assembly having a compartment 32, a device holder 33 held in compartment 32 for holding a mobile electronics device, and a compartment closure 34 in accordance with another embodiment of the present invention are respectively shown. This device holder assembly differs from the device holder assembly shown in FIGS. 7a, 7b, 7c, and 7d in that individual louvers 34 of closure 34 may be pushed one inside the other for opening compartment 2.

In order to improve the introduction of force into the swivelled-out device holders 29, 33, support systems as described above may be provided.

Each device holder 6, 29, 33 may swivel in and out of each compartment 2, 28, 32. This allows different device holders to be used with a compartment. Thus, each device holder matching a device may be inserted into the compartment. The bearing pins engaging in the side walls may have adjustment bevels to facilitate insertion of the device holder.

The progression of the electrical cabling for the plug-in connector on the device holder side may be such that the cabling is mounted on the inside of the strip and guided out through an axial borehole for bearing pin 20.

A compartment such as one of compartments 2, 28, 32 may have two or more device holders which may swivel in and out independently of one another.

LIST OF REFERENCE NUMERALS

1 Dashboard
2 Compartment
3 Frame
4 Compartment closure
5 Handle strip
6 Device holder
7 Strip
8 Side wall
9 Receptacle
10 Mobile telephone
11 Receptacle
12, 12' Side elements
13 Plug-in connection
14 Plug-in connection
15 Mobile navigation device
16 Closure element
17 Closure element
18 Display
19 Interior
20 Bearing pin
21 Bearing hole
22 First closure element
23 Guide
24 Guide strip
25 Edge
26 Support strip
27 Strip
28 Compartment
29 Device holder
30 Compartment Closure
31 Closure element
32 Compartment
23 Device holder
34 Compartment closure While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A device holder assembly for use in a vehicle, the assembly comprising:
a compartment having an opening on a top side;
a device holder attached to the compartment for holding a mobile electronics device, wherein the device holder is movable about a swivel axis with respect to the compartment between a storage position in which the device holder is stored within the compartment and a use position in which the device holder extends out from the compartment; and
a closure attached to the compartment, wherein the closure is movable relative to the top side of the compartment along lateral sides of the compartment between an opened position in which the closure opens the compartment, an intermediate closed position in which the closure substantially closes the compartment while the device holder is in its use position extending out from the compartment, and a fully closed position in which the closure fully closes the compartment while the device holder is in its storage position stored within the compartment.

2. The assembly of claim 1 wherein:
the device holder is situated at a distance from the lateral sides of the compartment;
wherein the closure has two closure extensions which enclose a recess of the closure, wherein the device holder extends through the recess out from the compartment when the device holder is in the use position and the closure is in the intermediate closed position.

3. The assembly of claim 2 wherein:
the device holder has two closure elements by which the regions of the compartment between the device holder and the lateral sides of the compartment are closed when the device holder is in the use position and the closure is in the intermediate closed position.

4. The assembly of claim 1 wherein:
the closure includes articulately interconnected closure elements which are displaceable to move the closure between the opened position, the intermediate closed position, and the fully opened position.

5. The assembly of claim 1 wherein:
the closure includes closure elements which are adjustable relative to one another to move the closure between the opened position, the intermediate closed position, and the fully opened position.

6. The assembly of claim 1 wherein:
the device holder includes a receptacle which is laterally enclosed by a pair of side members for receiving a mobile electronics device inserted therein.

7. The assembly of claim 6 wherein:
elements for securing the mobile electronics device inserted in the receptacle are associated with the side members.

8. The assembly of claim 1 wherein:
the device holder includes a plug-in contact for connecting the device to a vehicle component.

9. The assembly of claim 1 wherein:
the compartment is embedded in the top side of the dashboard of a vehicle.

10. The assembly of claim 1 wherein:
the closure is a roller blind closure.

11. The assembly of claim 1 wherein:
the closure is a louvered closure whose individual louvers are foldable into one another to move the closure between the opened position, the intermediate closed position, and the fully closed position.

12. The assembly of claim 1 wherein:
the closure is a louvered closure whose individual louvers are pushable into one another to move the closure between the opened position, the intermediate closed position, and the fully closed position.

13. A device holder assembly for use in a vehicle, the assembly comprising:
a compartment having an opening on a top side;
a device holder attached to the compartment for holding a mobile electronics device, wherein the device holder is movable with respect to the compartment between a storage position in which the device holder is within the compartment and a use position in which the device holder extends out from a portion of the opening of the compartment; and
a closure attached to the compartment, wherein the closure is movable relative to the top side of the compartment along lateral sides of the compartment between an opened position in which the closure opens the compartment while the device holder is in either of the storage and use positions such that the closure allows the device holder to move between the storage and use positions, a fully closed position in which the closure covers the compartment including the portion of the opening of the compartment which the device holder extends out from while the device holder is in the use position such that the closure prevents the device holder from moving between the storage and use positions, and an intermediate closed position in which the closure covers the compartment with the exception of the portion of the opening of the compartment which the device holder extends out from while in the use position such that the closure prevents the device holder from moving between the storage and uses positions, wherein the closure is movable to the intermediate closed position after the device holder has been moved to the use position.

14. The assembly of claim 13 wherein:
the compartment is embedded in the top side of the dashboard of a vehicle.

15. The assembly of claim 13 wherein:
the closure is a roller blind closure.

16. The assembly of claim 13 wherein:
the closure is a louvered closure whose individual louvers are foldable into one another to move the closure between the opened position, the intermediate closed position, and the fully closed position.

17. The assembly of claim 13 wherein:
the closure is a louvered closure whose individual louvers are pushable into one another to move the closure between the opened position, the intermediate closed position, and the fully closed position.

* * * * *